Patented May 18, 1937

2,081,119

UNITED STATES PATENT OFFICE 2,081,119

TREATMENT OF PUS AND GANGRENOUS CASES

Jesse Morales and Ellen Schulz Quillin, San Antonio, and Carlos L. Gutzeit, Austin, Tex.; said Morales and said Gutzeit assignors to said Quillin No Drawing. Application September 4, 1934, Serial No. 742,580

2 Claims. (Cl. 167—58)

The principal object of the invention is to provide a method of arresting degeneration and of promoting the healing of sores or wounds which have a pus or gangrenous condition and which respond with difficulty or not at all to other previously recognized methods of treatment.

In general, our improved method preferably contemplates the irrigation, immersion, or other analogous treatment of the infected areas with a solution or an extract, in dry or liquid form, of a plant known as Malva parviflora, L., commonly known as Malva castillo. Although an aqueous solution is customarily employed, the drug may also be incorporated in other forms, for example, it may be incorporated with talc to be used as a dusting powder or it may be combined with a neutral, inactive salve base. These added materials merely serve as vehicles for the purpose of obtaining the product in convenient form for certain uses.

In certain cases it may be desirable to supplement the product with a neutral non-oxidizing germicide or antiseptic. However, this germicide or antiseptic appears to form merely a supplemental function in connection with the treatment and is not essential to the particular action desired when using this special remedy.

The amount of material used depends upon the solvent used in extraction and the effect desired from the remedy, and to a lesser extent on the quality of the plant material. There is at present no precise method of assay of the drug principle. Quantities are based on the quantity of the plant as ordinarily obtained; that is, air dried and including leaves, stems and seeds but not roots. The plant used is obtained approximately at the time of ripening of the seeds or slightly before.

As ordinarily used, the final solution is equivalent to a 1 lb. plant to 40 gallons of water when made from an ethyl alcohol extract, or 1 lb. plant to 10 gallons water when made from an aqueous extract. For an extremely rapid effect, especially when bleeding is desired, this concentration may be increased to the equivalent of 1 lb. of the plant to 5 gallons of solution for the aqueous extract. For an extremely mild effect, especially where healing action is desired without bleeding, the concentration may be decreased; for example 1 lb. plant to 100 gallons final solution for the alcohol extract or 1 lb. plant to 25 gallons for the aqueous extract.

The alcohol and aqueous extracts are used for illustration since they are the simplest and most convenient methods of extraction. The extracts are initially of much higher concentration than the solution used in clinical treatment, the dilution being made according to the purpose desired.

As previously mentioned, the active material is included in the alcohol and water soluble part of the plant, including leaves, stems and seeds. No differentiation is made at the present time between the active material and inactive material such as chlorophyl, fats and plant dyes so extracted.

The remaining materials are matters of convenience. These are of three kinds:

(a) Such substances as ethyl alcohol or acetone which may be added to the aqueous extract or may be the extracting material and not removed. These substances serve to prevent deterioration due to fermentation and other bacterial action and also to keep the material sterile. They cannot be said to be strictly inactive. In very low concentrations they have very little effect; in high concentrations they have some tendency to counteract the effect of the remedy.

(b) Such substances as may be used as a powder or salve base and which are strictly inactive.

(c) Such substances that may be added to supplement the action of the remedy, such as an antiseptic or germicide. This may include substances which also furnish the characteristics desired under (a) and (b).

In the case of alcohol extracts or concentrates of these extracts it is desirable that the strength of the solution is such that on final dilution for use the alcohol content will not be greater than 10%, and preferably less than 5%.

The method of extraction may be either that of percolation or merely heating in an appropriate vessel and decanting the liquid extract. In either case the solvent should be at the boiling point for such solvents as alcohol, acetone or water. The best results are obtained with an organic solvent that will penetrate the plant material and break down the cell walls.

In regard to the choice of solvents for extraction. Extraction with water has the disadvantage that the extraction is not very efficient and the resulting solution cannot easily be concentrated. In addition such a solution contains enough carbohydrate material that it will readily ferment and be contaminated with mold growths unless stabilized by the addition, for example, of about 10% ethyl alcohol.

Extraction with ethyl alcohol has the advantage that alcohol is very efficient in dissolving the active material from the plant, the extract is sterile and stable against deterioration, and the extract is readily concentrated further if so desired.

Other solvents that may be used include other alcohols, e. g. methyl, acetone, and to a slight degree ether, chloroform, or benzene. Acetone is slightly less efficient than ethyl alcohol but the extracts are somewhat simpler to concentrate. Methyl alcohol is similar to ethyl alcohol in solvent powers but has the disadvantage that it is toxic and must be removed from the active principle before use.

As examples of methods of extraction, the following may be given:

1/16 lb. of the ground plant is mixed with 1 gallon of water and the mixture rapidly heated to boiling. The mixture is kept gently boiling for 1/2 hour, cooled, and the aqueous extract decanted. 10% by volume of ethyl alcohol is added to stabilize the solution.

1 lb. of the ground plant is mixed with 1 gallon 95% ethyl alcohol and the mixture rapidly heated to boiling. After boiling gently for 1/2 hour the mixture is cooled and the alcohol extract decanted. The residual plant material may be advantageously extracted a second time, this second extract then being used as indicated above to extract a fresh portion of the plant. This alcoholic extract is diluted 1 to 40 with sterile water for ordinary use.

The above extract may be concentrated by evaporation of the alcohol, preferably at reduced pressure. If a powder is desired, the alcoholic extract may be mixed with the powder base, such as talc in the proportions desired or the alcohol solution may be evaporated to dryness and the residue mixed with the powder base. For example, an appropriate powder for producing rapid bleeding is obtained by mixing 50 cc. of the above alcoholic extract with 1 gram pure talc and evaporating to dryness under reduced pressure.

The purpose and use of this remedy has been to devise a treatment that would control local infection and inflammation, more particularly referred to as "pus" cases, where the usual remedies have failed. Care has been used to select cases that have failed to respond to the usual therapy, such as surgery, disinfectants, healing applications and hot solutions. After these ordinary remedies have failed, the solution of this remedy has been applied, with good results. Many times cases have been encountered of cellulitis of the extremities that in spite of drainage, serum and bacteriophage grow progressively worse. The effect here has been to develop a solution that would greatly increase the blood supply to the affected part, thereby mobilizing a largely increased number of phagocytes in the affected area, hoping that the heavy congestion might mechanically cause a discharge of pus and blood from the inflamed part and prevent the absorption of toxins into the blood stream.

In using this solution, it has been found that some incised wounds discharging pus when first immersed in this solution will start bleeding within fifteen seconds to ten minutes, although this is not the case with all wounds. One thing definitely noticed in practically all cases is that the patient will immediately complain of a strong pulling or drawing sensation in the part submerged, and that after four to six hours the part will be swollen due to engorgement with blood. It is believed that this is due to a dilatation of the main arteries, the collateral vessels and the capillaries. If it is a well localized cellulitis with free pus, surrounded by fairly healthy tissue, and is freely incised to reach the pus pocket, the free edges of the wound may drain several ounces of blood within the first two hours; and as much as two cups of strained pus has been removed from an afflicted hand within this time. In twenty four hours the pale dark discolored area changed to a pink reddish color, and clumps of necrotic tissue separated, leaving the wound draining freely. The surrounding parts take on a healthy appearance, a normal physiological condition replacing the pathological state.

So far as has been determined, no toxic condition has followed the continuous use of the solution for three months. It has been taken by mouth without ill effects and 400 cc. have been injected into the peritoneal cavity of dogs without producing peritonitis or any other bad results, but with immediate healing effect on non-healing structures. It has been observed that the white count drops about three thousand a day, for several days; and where there is fever to the point of 103 it will rapidly come down to the normal. The patient regains his appetite and feeling of well-being.

There has been in no case a destructive action on healthy tissue. The edges of incised wounds tend to heal and become clean and healthy. Superficial infections heal rapidly with normal granulation. In chronic cases the wound has sometimes been merely painted with the solution, or a sponge or sterilized gauze saturated with the solution has been applied. In one instance there was some complaint of irritation of the wound after long continued treatment, but this does not occur when the solution is properly diluted.

We claim as our invention:

1. A pharmaceutical adapted for external application in pus or gangrenous cases which comprises an extract from the plant known as *Malva parviflora*.

2. A pharmaceutical especially adapted for external application in pus and gangrenous cases, comprising an extract of the plant known as *Malva parviflora*, exclusive of the roots of said plant.

JESSE MORALES.
ELLEN SCHULZ QUILLIN.
CARLOS L. GUTZEIT.